United States Patent
Itou et al.

(10) Patent No.: US 9,874,802 B2
(45) Date of Patent: Jan. 23, 2018

(54) IMAGE DISPLAY APPARATUS AND IMAGE DISPLAY METHOD

(71) Applicant: NEC Display Solutions, Ltd., Tokyo (JP)

(72) Inventors: Yasushi Itou, Tokyo (JP); Yoshinobu Moriya, Tokyo (JP)

(73) Assignee: NEC Display Solutions, Ltd., Tokyo (JP)

( * ) Notice: Subject to any disclaimer, the term of this patent is extended or adjusted under 35 U.S.C. 154(b) by 67 days.

(21) Appl. No.: 14/894,964

(22) PCT Filed: Jun. 21, 2013

(86) PCT No.: PCT/JP2013/067031
§ 371 (c)(1),
(2) Date: Nov. 30, 2015

(87) PCT Pub. No.: WO2014/203387
PCT Pub. Date: Dec. 24, 2014

(65) Prior Publication Data
US 2016/0116829 A1 Apr. 28, 2016

(51) Int. Cl.
*G03B 21/10* (2006.01)
*G03B 21/56* (2006.01)
(Continued)

(52) U.S. Cl.
CPC .............. *G03B 21/10* (2013.01); *E04B 5/46* (2013.01); *E04F 15/02* (2013.01); *G02B 1/11* (2013.01);
(Continued)

(58) Field of Classification Search
CPC ........ G03B 21/10; G03B 21/56; G03B 21/62; G03B 21/145; G03B 21/13; G03B 21/16;
(Continued)

(56) References Cited

U.S. PATENT DOCUMENTS 5,085,495 A * 2/1992 Iwahara ................ G03B 21/02
348/779
2004/0057024 A1* 3/2004 Nishio ................... G03B 21/26
353/94
2007/0230122 A1* 10/2007 Kishi ..................... G03B 21/16
361/695

FOREIGN PATENT DOCUMENTS

JP H 05-181195 A 7/1993
JP H 11-024167 A 1/1999
(Continued)

OTHER PUBLICATIONS

International Search Report (ISR) (PCT Form PCT/ISA/210), in PCT/JP2013/067031, dated Aug. 20, 2013.
(Continued)

*Primary Examiner* — Ryan Howard
(74) *Attorney, Agent, or Firm* — McGinn IP Law Group, PLLC (57) ABSTRACT

An image display apparatus includes: a transparent board that transmits visible light; a screen that is provided on one surface of the transparent board; a projector that projects an image toward the screen from the other surface side of the transparent board; and a support unit that supports the transparent board from the other surface side. The projector is disposed outside of the space that is enclosed by the transparent board and the support unit.

10 Claims, 9 Drawing Sheets

(51) Int. Cl.
- *H04N 9/31* (2006.01)
- *G03B 21/13* (2006.01)
- *G03B 21/14* (2006.01)
- *E04B 5/46* (2006.01)
- *E04F 15/02* (2006.01)
- *G02B 1/11* (2015.01)
- *G03B 21/62* (2014.01)
- *G03B 21/28* (2006.01)
- *E04F 15/024* (2006.01)

(52) U.S. Cl.
CPC .......... *G03B 21/13* (2013.01); *G03B 21/145* (2013.01); *G03B 21/62* (2013.01); *H04N 9/3147* (2013.01); *E04F 15/024* (2013.01); *G03B 21/28* (2013.01); *G03B 21/56* (2013.01)

(58) Field of Classification Search
CPC ...... H04N 9/3147; E04F 15/02; E04F 15/024; E04B 5/46

USPC .......................................... 359/453, 456, 460
See application file for complete search history.

(56) References Cited

FOREIGN PATENT DOCUMENTS

| | | |
|---|---|---|
| JP | 2000-122175 A | 4/2000 |
| JP | 2000-305079 A | 11/2000 |
| JP | 2004-012712 A | 1/2004 |
| JP | 2004-015332 A | 1/2004 |
| JP | 2005-228102 A | 8/2005 |
| JP | 2006-343910 A | 12/2006 |
| JP | 2007-108677 A | 4/2007 |

OTHER PUBLICATIONS

Japanese Office Action dated Aug. 23, 2016 with a partial English translation.

* cited by examiner

IMAGE DISPLAY APPARATUS AND IMAGE DISPLAY METHOD

TECHNICAL FIELD

The present invention relates to an image display apparatus that allows a load to be applied to a projection surface upon which an image is projected.

BACKGROUND ART

A display apparatus that allows an image to be observed through a transparent floor is disclosed in Patent Document 1. This display apparatus has a transmissive screen that is installed horizontally, a projector that is installed below the transmissive screen, and a transparent floor (tempered glass) that is installed with an interposed predetermined gap over the transmissive screen.

The projector projects an image on the transmissive screen. The image that is displayed on the transmissive screen below the floor can be observed from above the floor. The invention enables, for example, the publicizing of products or events to pedestrians by the displaying images of advertisements or exhibited objects.

LITERATURE OF THE PRIOR ART

Patent Documents

Patent Document 1: Japanese Unexamined Patent Application Publication No. 2000-122175

SUMMARY OF THE INVENTION

However, in the display apparatus of Patent Document 1, because the transparent floor (tempered glass) and transmissive screen are arranged with a predetermined gap interposed, an observer above the floor observes an image that is displayed at a greater depth than the floor. In this case, the observer will experience the uncomfortable sensation in which he or she is floating above the surface on which the image is displayed (the transmissive screen).

In addition, the tempered glass must be made thick to prevent damage from the weight of pedestrians. The use of thick tempered glass exacerbates the uncomfortable sensation described above.

It is an object of the present invention to provide an image display apparatus and image display method that do not give rise to the above-described uncomfortable sensation.

The image display apparatus of the present invention for achieving the above-described object includes:
a transparent board that transmits visible light;
a screen that is provided on one surface of the transparent board;
a projector that projects images toward the screen from the side of the other surface of the transparent board; and
a support unit that supports the transparent board from the side of the other surface;
wherein the projector is arranged outside a space that is enclosed by the transparent board and the support unit.

The image display method of the present invention is characterized by forming a screen on one surface of a transparent board that transmits visible light; supporting the transparent board from the side of the other surface by means of a support unit; and projecting an image toward the screen from the side of the other surface of the transparent board by means of a projector that is arranged outside a space enclosed by the transparent board and the support unit to display an image on the screen.

EXPLANATION OF REFERENCE NUMBERS 1 projector
2 screen
3 transparent board
4 support unit
4a, 4b beam
5 six-axial adjustment mechanism

BEST MODE FOR CARRYING OUT THE INVENTION

Exemplary embodiments of the present invention are next described with reference to the accompanying drawings.

First Exemplary Embodiment

Figure 1:
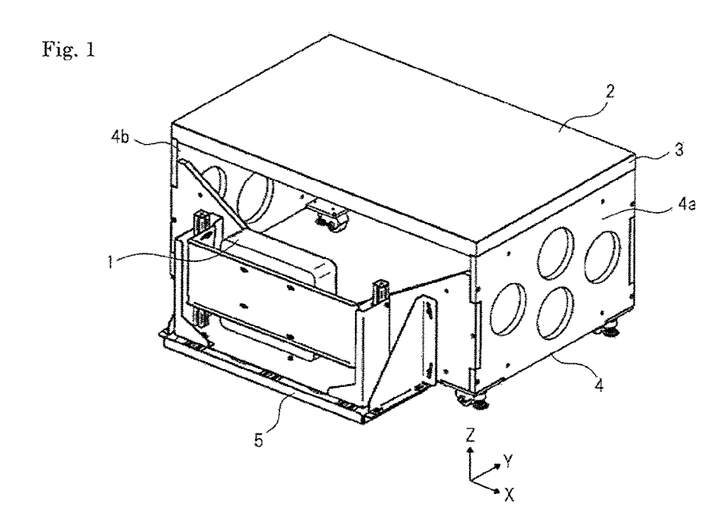
FIG. 1 is a perspective view showing the outer appearance of an image display apparatus that is the first exemplary embodiment of the present invention.
Figure 2:
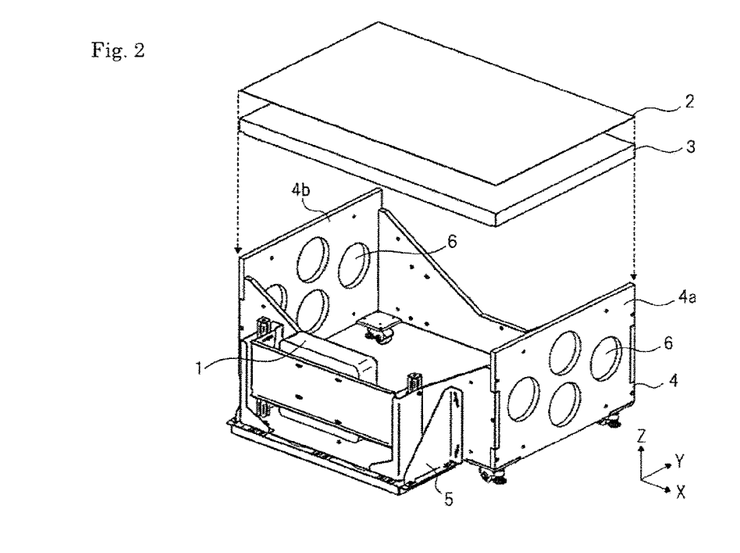
FIG. 2 is an exploded perspective view of the image display apparatus shown in FIG. 1.

FIG. 1 is a perspective view showing the outer appearance of the image display apparatus that is the first exemplary embodiment of the present invention, and FIG. 2 is an exploded perspective view of this image display apparatus. In addition, FIG. 3 is a perspective view showing the outer appearance of the image display apparatus shown in FIG. 1 when viewed from the opposite side.

Figure 3:
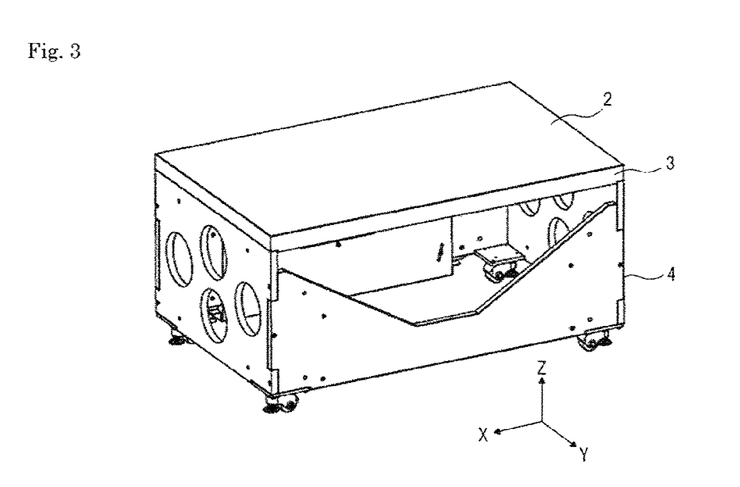
FIG. 3 is a perspective view showing the outer appearance of the image display apparatus shown in FIG. 1 as seen from the opposite side.

Referring to FIGS. 1-3, the image display apparatus includes projector 1, screen 2, transparent board 3, support unit 4, and six-axial adjustment mechanism 5.

Transparent board 3 is made up of a material that is transparent to at least visible light, and more specifically, is composed of a material such as an acrylic board that can transmit projected light from projector 1 while absorbing virtually no light.

Support unit 4 supports the rear surface side of transparent board 3 such that the surface of transparent board 3 intersects and is preferably orthogonal to the direction of gravity (that is the direction of a vertical line, hereinbelow referred to as simply the vertical direction). For example, an adjuster function that enables adjustment in the direction of each of the X-axis, Y-axis, and Z-axis in the space of XYZ is provided in the base unit of support unit 4, and this adjuster function enables adjusting the angle of the surface of transparent board 3 with respect to the vertical direction.

In addition, support unit 4 includes beams 4a and 4b that are arranged opposite each other. The shape of transparent board 3 is substantially rectangular, and the portions (edges) of two opposite sides are supported by beams 4a and 4b. Transparent board 3 has a thickness in the order of, for example, 30 mm-50 mm, which is a thickness that will not break despite the application of a load imposed by people when in a state supported by support unit 4.

Each of beams 4a and 4b is made up of a plate component having a plurality of openings 6. Air flows into support unit 4 from the outside or air inside support unit 4 flows to the outside of support unit 4 by way of each of the openings 6 of beams 4a and 4b. The shape, size, and number of openings 6 are not limited to the form shown in the figure. The shape, size, and number of openings 6 may be set in any way as long as support unit 4 is able to support transparent board 3 in a state in which a predetermined load is applied to transparent board 3, for example, in a state in which people are standing on transparent board 3.

Screen 2 is a transmissive screen and is provided on the surface of transparent board 3. Here, the obverse surface of transparent board 3 is the surface opposite the side on which support unit 4 is arranged.

Projector 1 projects an image toward screen 2 from the reverse surface side of transparent board 3. Projector 1 is installed on six-axial adjustment mechanism 5.

Six-axial adjustment mechanism 5 is a component for mechanically adjusting the relative position and angle of screen 2 and projector 1 and is attached to support unit 4. For example, six-axial adjustment mechanism 5 includes a movement mechanism that is movable in the directions of each of the X-axis, Y-axis, and Z-axis and a rotation mechanism that is rotatable around each of the X-axis, Y-axis, and Z-axis in the XYZ three-dimensional space.

This movement mechanism and rotation mechanism enable the six adjustments of horizontal position, vertical position, horizontal tilt angle, vertical tilt angle, inclination and projection distance, and enable adjusting the position and shape of an image that is projected on screen 2.

Projector 1 is arranged outside the space enclosed by transparent board 3 and support unit 4. More specifically, projector 1 is arranged so as not to overlap with transparent board 3 when viewed from a vertical direction with respect to the obverse surface of transparent board 3 (or the surface of screen 2).

Projector 1 is, for example, an ultra-short throw projector and is configured to perform upcast projection (or downcast projection). Because constructions for performing upcast projection (or downcast projection) are well known, a detailed explanation of the construction is here omitted and only a simple explanation of the principles will be presented.

Projector 1 includes a light source, a display device that spatially modulates the light beam from the light source to form an image, and a projection lens that projects the image that was formed in the display device. A liquid crystal device or digital mirror device (DMD) is used for the display device.

When the center of the image formation region in which an image is formed on a display device is shifted downward from the optical axis of the projection lens, the center of the projected image will be positioned above the optical axis of the projection lens. Projection in this state is here referred to as "upcast projection."

On the other hand, when the center of the image formation region is shifted upward from the optical axis of the projection lens, the center of the projected image will be positioned below the optical axis of the projection lens. Projection in this state is here referred to as "downcast projection."

Figure 4:
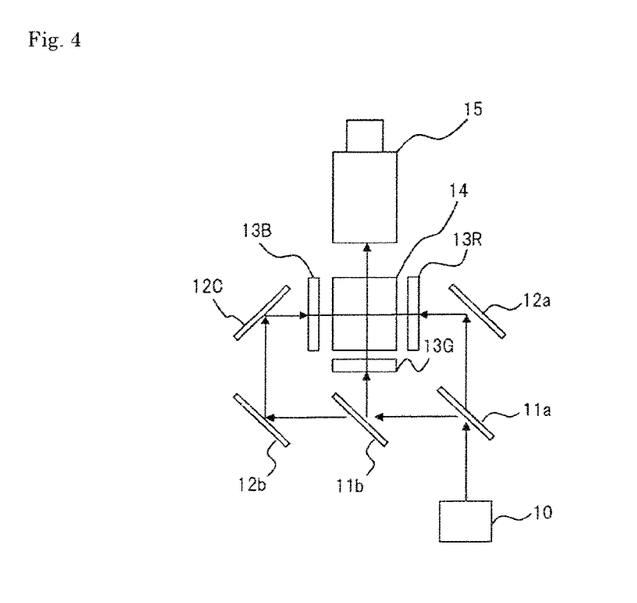
FIG. 4 is a schematic view showing an example of the projector of the image display apparatus shown in FIG. 1.

FIG. 4 shows the schematic configuration of a liquid crystal projector that is used as projector 1 and that performs upcast projection.

Referring to FIG. 4, the liquid crystal projector includes light source 10, dichroic mirrors 11a and 11b, mirrors 12a-12c, liquid crystal panels 13R, 13G, and 13B, prism 14, and projection lens 15.

The light beam from light source 10 is entered into dichroic mirror 11a at an angle of incidence of approximately 45 degrees. Of the red light, blue light, and green light that are included in the light beam from light source 10, the red light is transmitted through dichroic mirror 11a and the blue light and green light are reflected by dichroic mirror 11a.

The blue light and green light that are reflected by dichroic mirror 11a are entered into dichroic mirror 11b at an angle of incidence of approximately 45 degrees. The blue light is transmitted through dichroic mirror 11b and the green light is reflected by dichroic mirror 11b.

The red light that was transmitted through dichroic mirror 11a is irradiated into liquid crystal panel 13R via mirror 12a. The blue light that was transmitted through dichroic mirror 11b is irradiated into liquid crystal panel 13B via mirrors 12b and 12c. The green light that was reflected by dichroic mirror 11b is irradiated into liquid crystal panel 13G. Liquid crystal panels 13R, 13G and 13B form a red image, a green image and a blue image, respectively.

Prism 14 synthesizes the red light, green light, and blue light from liquid crystal panels 13R, 13G and 13B. The light that is synthesized in prism 14 is entered into projection lens 15.

Projection lens 15 projects the red image, green image and blue image that were formed in liquid crystal panels 13R, 13G and 13B, respectively, onto the screen.

Because upcast projection is being carried out, the centers of the image formation regions of each of liquid crystal panels 13R, 13G and 13B are positioned a predetermined distance below the optical axis of projection lens 15.

Projector 1 is not limited to the above-described liquid crystal projector. Various projectors that are capable of upcast projection or downcast projection can be used as projector 1.

Referring again to FIGS. 1-3, six-axial adjustment mechanism 5 is capable of adjustment such that the images projected from projector 1 coincide with the shape of screen 2. However, distortion (for example, trapezoidal distortion) in the projected image may arise due to adjustment by six-axial adjustment mechanism 5. This type of trapezoidal distortion can typically be corrected by adjusting the shape of the image formation region on the display device. This correction of trapezoidal distortion is a well-known technique and explanation is therefore here omitted.

The principles of image display by way of transparent board 3 in the image display apparatus of the present exemplary embodiment are next explained.

Figure 5A:
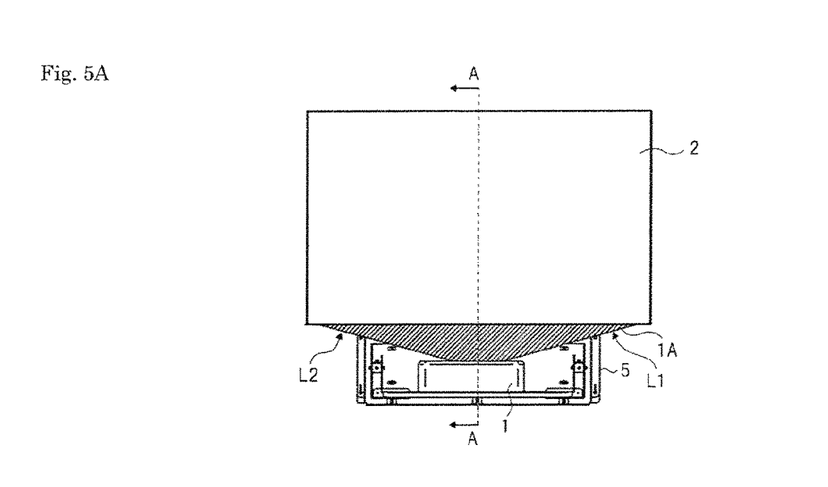
FIG. 5A is a schematic view showing the state of projection of the projector when the image display apparatus shown in FIG. 1 is viewed from the upper surface.
Figure 5B:
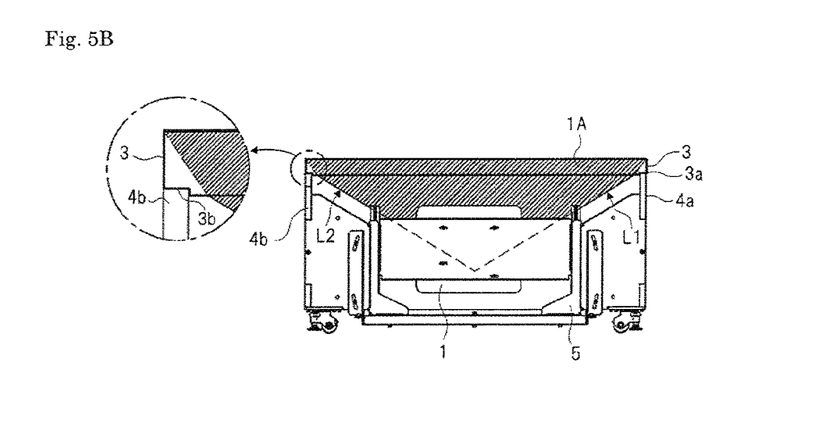
FIG. 5B is a schematic view showing another state of projection of the projector when the image display apparatus shown in FIG. 1 is viewed from the side surface.

FIG. 5A is a schematic view showing the state of projection of projector 1 when the image display apparatus shown in FIG. 1 is viewed from the screen side. FIG. 5B is a schematic view of the state of projection of projector 1 when the image display apparatus shown in FIG. 1 is viewed from the side on which projector 1 is installed. In FIGS. 5A and 5B, the hatched portion 1A that uses diagonal lines indicates the region through which projected light from projector 1 passes.

As shown in FIGS. 5A and 5B, hatched portion 1A spreads at a predetermined angle in the direction of travel of the projected light. The angles of incidence with respect to the rear surface of transparent board 3 of the two light rays L1 and L2 that pass along the outermost sides of hatched portion 1A are substantially the same.

In the process of passing through the rear surface of transparent board 3, the projected light is refracted according to Snell's law. In the present exemplary embodiment, of the two light rays L1 and L2 that pass along the outermost sides of hatched portion 1A, light ray L2 on the left side (the beam-4b side) is refracted as it passes through the rear surface of transparent board 3, and light ray L2 that has passed through the rear surface travels within transparent board 3 to reach the corner on the screen-2 side at the end portion that is supported by beam 4b, as shown in FIG. 5B. Similarly, light ray L1 on the right side (the beam-4a side) is also refracted as it passes through the rear surface of transparent board 3, and light ray L1 that has passed through the rear surface reaches the corner on the screen-2 side on the end portion that is supported by beam 4a. Thus, if screen 2 is the same size as transparent board 3, an image can be displayed over the entire width of screen 2 with respect to the direction orthogonal to beams 4a and 4b.

In addition, as shown in FIG. 5B, notch 3b having an L-shaped sectional form is provided on the end portion of transparent board 3 that is supported by beam 4b. Similarly, L-shaped notch 3a is also provided on the end portion of transparent board 3 that is supported by beam 4a. Transparent board 3 is supported by support unit 4 with these notches 3a and 3b set on the angled portions on the upper edges of beams 4a and 4b, respectively. Transparent board 3 is able to slide along beams 4a and 4b.

Notches 3a and 3b are formed in areas other than hatched portion 1A, and projected light from projector 1 therefore is not irradiated upon notches 3a and 3b. Accordingly, notches 3a and 3b do not interfere with the projection of images.

Figure 6:
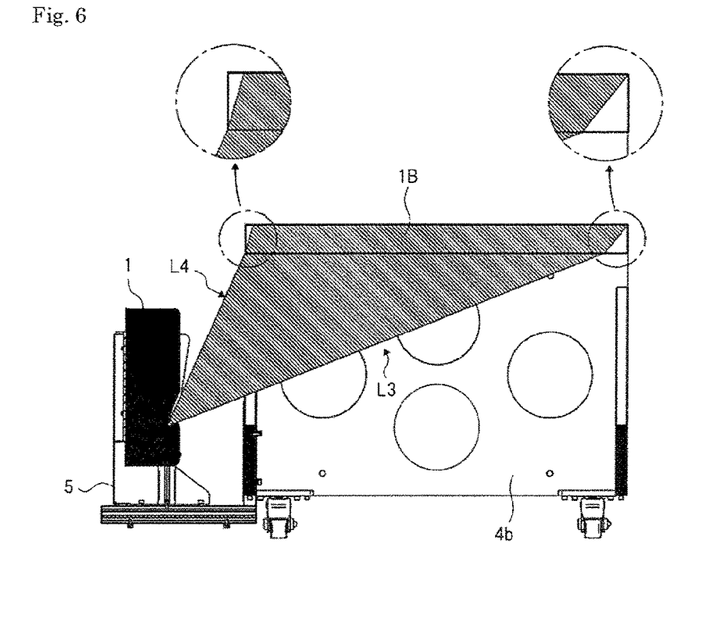
FIG. 6 is a schematic view showing the state of projection of the projector when cut along the alternate long and short dashed line AA of the image display apparatus shown in FIG. 5A.

FIG. 6 is a schematic view showing the state of projection of projector 1 when cut along the alternate long and short dashed line AA of the image display apparatus shown in FIG. 5A. In FIG. 6, hatched portion 1B that is hatched using diagonal lines indicates the area through which projected light from projector 1 passes.

As shown in FIG. 6, hatched portion 1B spreads at a predetermined angle in the direction that projected light travels. Of two light rays L3 and L4 that pass along the outermost sides of hatched portion 1B, the angle of incidence of light ray L3 with respect to the rear surface of transparent board 3 is greater than the angle of incidence of light ray L4 with respect to the rear surface of transparent board 3. Here, light ray L4 is entered from the edge of the rear surface of transparent board 3 on the projector 1 side, and light ray L3 is entered from the opposite edge of the rear surface of transparent board 3.

Light ray L3 is refracted as it passes through the rear surface of transparent board 3, and light ray L3 that has passed through this rear surface travels inside transparent board 3 to arrive at the corner on the screen-2 side of the end portion that is on the opposite side from the projector 1 side.

In contrast, light ray L4 is refracted as it passes through the rear surface of transparent board 3, and light ray L4 that has passed through this rear surface travels inside transparent board 3 to arrive at the surface on the screen-2 side of the end portion on the projector 1 side (a portion located slightly inward from the corner).

When screen 2 is the same size as transparent board 3, an image can be displayed over substantially the entire width of screen 2 with respect to the projection direction of projector 1 (specifically, a direction parallel to beams 4a and 4b) when viewed from a direction perpendicular to screen 2.

According to the image display apparatus of the present exemplary embodiment that is described hereinabove, an observer can stand on screen 2 and can observe an image that is displayed on screen 2. In this case, the observer is standing on the display surface of the image, and as a result, when, for example, an image of the ground is displayed, the observer is able to feel that he or she is standing directly on the ground and will not experience an unintended sensation of discomfort in the display image that he or she is floating above the surface on which the image is displayed (screen 2).

Figure 7:
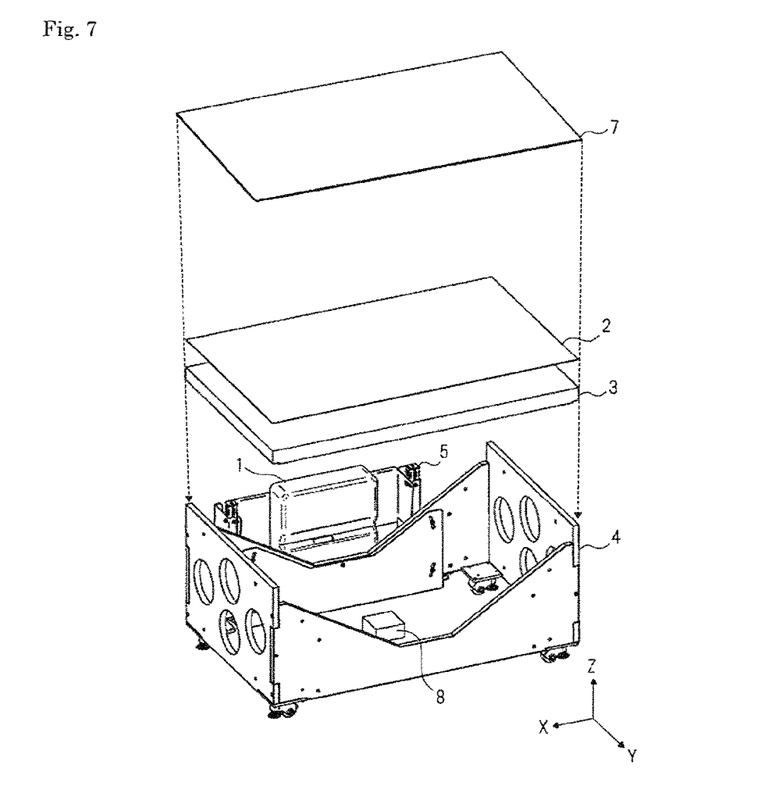
FIG. 7 is an exploded perspective view showing an example of a modification of the image display apparatus shown in FIG. 1.

Modifications or additions may be made to the configuration as appropriate in the image display apparatus of the present exemplary embodiment. For example, protective material 7 may be provided on the surface of screen 2 as shown in FIG. 7. Protective material 7 can employ a material that is transparent to at least visible light such as tempered glass.

By providing protective material 7 on the surface of screen 2, damage to screen 2 can be prevented when there are people on screen 2. In addition, protective material 7 may be thin, whereby the above-described uncomfortable sensation does not occur.

In addition, sensor 8 that detects the presence, absence, or movement of people on screen 2 may be installed in support unit 4. As an example, an infrared sensor can be used for sensor 8. For example, a control device (not shown) that controls the operation of projector 1 may be provided, and this control device may change the content of the image that is projected by projector 1 according to the output signal of sensor 8. The displayed image can thus be varied according to the presence, absence, or movement of people.

In addition, a component can also be used as projector 1 that positions the center of the image formation region on the optical axis of the projection lens (a component that is not designed to perform upcast projection or downcast projection).

Second Exemplary Embodiment

Figure 8:
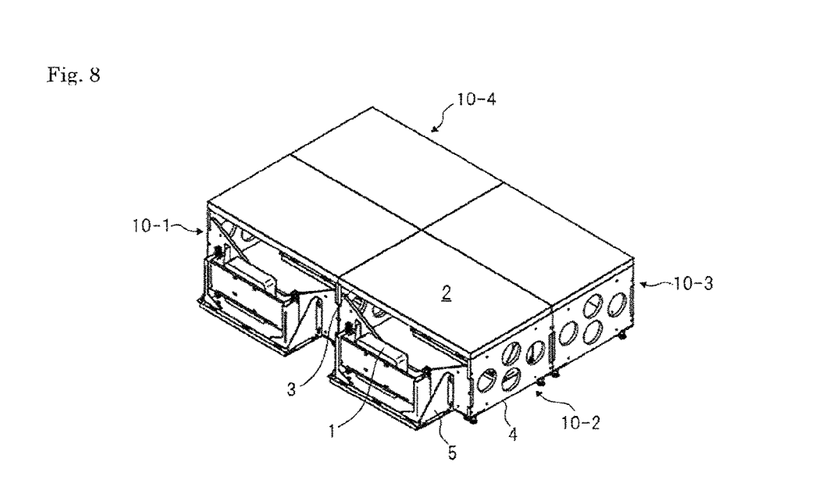
FIG. 8 is a perspective view showing the outer appearance of the image display apparatus that is the second exemplary embodiment of the present invention.

FIG. 8 is a perspective view that shows the outer appearance of the image display apparatus that is the second exemplary embodiment of the present invention.

As shown in FIG. 8, the image display apparatus of the present exemplary embodiment is made up of four units 10_1-10_4 that are arranged in two rows and two columns. Each of units 10_1-10_4 is of the same configuration as the image display apparatus of the first exemplary embodiment, but the construction of the end portions of transparent boards 3 is different.

Transparent boards 3 of units 10_1-10_4 are configured so as to be joined in the row direction and column direction.

Figure 9A:
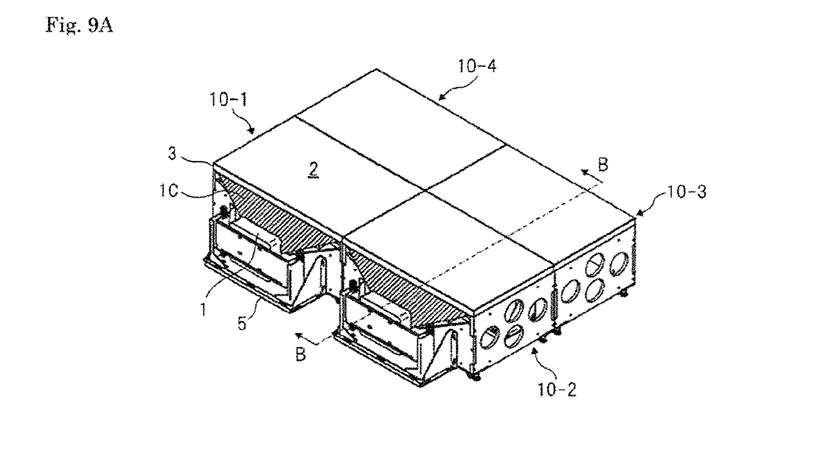
FIG. 9A is a schematic view showing the state of projection of the image display apparatus shown in FIG. 8.
Figure 9B:
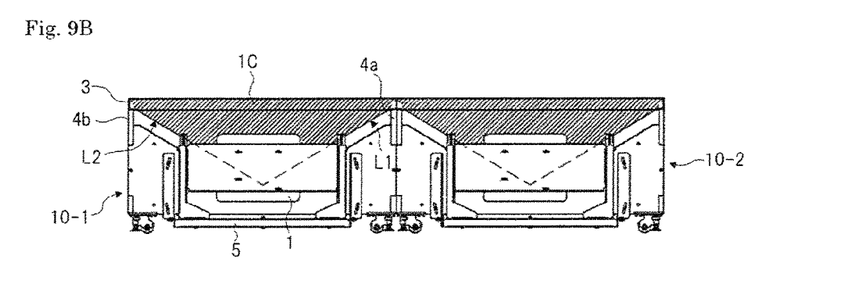
FIG. 9B is a schematic view showing the state of projection when viewed from the side in which two projectors are installed aligned in the row direction of the image display apparatus shown in FIG. 8.

FIG. 9A is a schematic view showing the state of projection of the image display apparatus shown in FIG. 8. FIG. 9B is a schematic view showing the state of projection when two units 10_1 and 10_2 that are aligned in the row direction of the image display apparatus shown in FIG. 8 are viewed from the side on which projectors 1 are installed. In FIGS. 9A and 9B, hatched portion 1C that is hatched using diagonal lines indicates the regions through which projected light from projectors 1 passes in units 10_1 and 10_2.

Units 10_1 and 10_2 are configured such that the mutually facing end surfaces of transparent boards 3 are joined. The angle formed by these joining surfaces and the surfaces of transparent boards 3 is approximately 90 degrees.

Hatched portion 1C spreads at a predetermined angle in the direction that projected light travels, as in the example shown in FIGS. 5A and 5B (hatched portion 1A). The angles of incidence with respect to the rear surface of transparent board 3 of two light rays L1 and L2 that pass along the outermost sides of hatched portion 1C are also approximately the same.

As shown in FIG. 9B, light rays L1 and L2 in each of units 10_1 and 10_2 are refracted upon passing through the rear surface of transparent boards 3, and light rays L1 and L2 that have passed through the rear surfaces travel within transparent boards 3. Light ray L1 reaches the corner on the screen-2 side of the end portion that is supported by beam 4a, and light ray L2 reaches the corner on the screen-2 side of the end portion that is supported by beam 4b.

Units 10_3 and 10_4 are of the same construction as the above-described units 10_1 and 10_2 and have the above-described relation of light rays L1 and L2 and transparent boards 3.

By means of the above-described construction, an image can be displayed over the entire width of screen 2 with respect to the row direction in each of units 10_1-10_4. As a result, the projected image from projector 1 of unit 10_1 and the projected image from projector 1 of unit 10_2 can be displayed adjacent to each other without any gap. Similarly, the projected image from projector 1 of unit 10_3 and the projected image from projector 1 of unit 10_4 can be displayed adjacent to each other without any gap.

Of units 10_1-10_4, the two units that are adjacent in the direction of projection of projector 1 (the column direction) are configured such that adjacent end surfaces of transparent boards 3 that are orthogonal to the direction of projection of projector 1 join together, the joined end surfaces being formed such that the joined portions on the rear surfaces are positioned closer to projector 1 side than the joined portions on the surfaces.

The configuration of the above-described joined surfaces is next described more concretely.

Figure 9C:
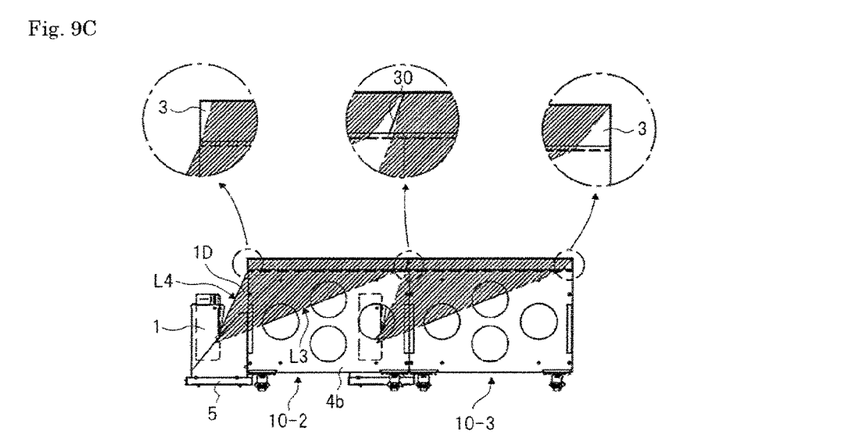
FIG. 9C is a schematic view showing the state of projection when two units aligned in the column direction of the image display apparatus shown in FIG. 9A are cut along the alternate long and short dashed line BB.

FIG. 9C is a schematic view showing the state of projection when two units 10_2 and 10_3 that are aligned in the column direction of image display apparatus shown in FIG. 9A have been cut along the alternate long and short dashed line BB. In FIG. 9C, hatched portion 1D that is hatched using diagonal lines indicates the region through which the projected light passes from projector 1 of each of units 10_2 and 10_3.

Hatched portion 1D spreads at a predetermined angle in the direction that projected light travels, similar to the example (hatched portion 1B) shown in FIG. 6. In unit 10_2, of light rays L3 and L4 that pass along the outermost sides of hatched portion 1D, the angle of incidence of lower side light ray L3 with respect to the rear surface of transparent board 3 is greater than the angle of incidence of upper side light ray L4 with respect to the rear surface of transparent board 3. The same is true of unit 10_3.

In unit 10_2, light rays L3 and L4 are each entered from the rear surface of transparent board 3 and are refracted after having passed through the rear surface. Light rays L3 and L4 that have been entered from the rear surface travel inside transparent board 3. Light ray L3 then reaches the corner on the screen-2 side of the end portion on the unit-10_3 side. On the other hand, light ray L4 reaches the vicinity of the corner of the screen-2 side of the end portion on the projector 1 side.

Projector 1 on the side of unit 10_3 is located in the space enclosed by support unit 4 and transparent board 3 on the unit-10_2 side, but projected light from projector 1 on the unit-10_2 side is not blocked by projector 1 on the unit-10_3 side.

In unit 10_3 as well, light rays L3 and L4 are each entered from the rear surface of transparent board 3 and are refracted after having passed through the rear surface. Light rays L3 and L4 that have been entered from the rear surface travel within transparent board 3. Light ray L3 then reaches the corner on the screen-2 side of the side opposite unit 10_2. On the other hand, light ray L4 reaches the corner of the screen-2 side of the end portion on the projector 1 side.

End portion 30 of the unit-10_3 side of transparent board 3 of unit 10_2 is cut diagonally. If the angle formed by the cut surface (end surface) of end portion 30 and the surface of transparent board 3 is $\theta1$, the angle formed by light ray L3 in transparent board 3 and the surface of transparent board 3 in unit 10_2 is $\theta2$, and the angle formed by light ray L4 in transparent board 3 and the surface of transparent board 3 in unit 10_3 is $\theta3$, then the relation $\theta2 \leq \theta1 \leq \theta3$ is satisfied.

In addition, the end portion of the unit-10_2 side of transparent board 3 of unit 10_3, i.e., the end portion that contacts end portion 30 of transparent board 3 of unit 10_2, is also cut diagonally. If the angle formed by the cut surface (end surface) of this end portion and the surface of transparent board 3 is $\theta4$, then $\theta4 = 180° - \theta1$.

Since the end surfaces of transparent boards 3 of each of units 10_2 and 10_3, which contact each other, are configured as described hereinabove, these end surfaces can be joined without having any gap, and further, light ray L3 on the unit-10_2 side and light ray L4 on the unit-10_3 side are emitted from the border portion of the surfaces of these transparent boards 3. In this way, the projected image of projector 1 of unit 10_2 and the projected image of projector 1 of unit 10_3 can be displayed adjacent to each other with no gap.

Units 10_1 and 10_4 that are aligned in the column direction are also of the same construction as units 10_2 and 10_3, and the projected image of projector 1 of unit 10_1 and the projected image of projector 1 of unit 10_4 can therefore also be displayed adjacent to each other with no gap.

In the present exemplary embodiment as well, notches 3a and 3b shown in FIG. 5B are provided at both end portions of transparent boards 3 that are supported by beams 4a and 4b in each of units 10_1-10_4. Transparent boards 3 are supported by support unit 4 with these notches 3a and 3b set in the angled edge portions of the upper edges of each of beams 4a and 4b, respectively. Transparent boards 3 can slide along beams 4a and 4b.

By means of the above-described sliding construction, transparent board 3 of unit 10_4 can be easily joined with transparent board 3 of unit 10_1, and transparent board 3 of unit 10_3 can be easily joined with transparent board 3 of unit 10_2.

In addition, projectors 1 of each of units 10_1-10_4 are configured to perform upcast projection. As a result, projector 1 of unit 10_3 is arranged in support unit 4 of unit 10_2, and projector 1 of unit 10_4 is arranged in support unit 4 of unit 10_1. When projector 1 is arranged in support unit 4, the temperature in support unit 4 rises due to the heat discharged from projector 1, whereby the temperature of transparent board 3 and screen 2 rises, and the temperature of projector 1 itself also rises. In the present exemplary embodiment, the increase of temperature in support unit 4 can be prevented due to the provision of a plurality of openings 6 in beams 4a and 4b of support unit 4.

Third Exemplary Embodiment

Figure 10:
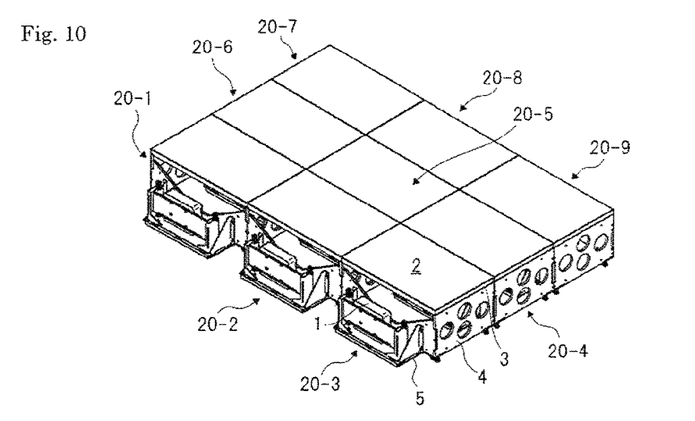
FIG. 10 is a perspective view showing the outer appearance of the image display apparatus that is the third exemplary embodiment of the present invention.

FIG. 10 is a perspective view showing the outer appearance of the image display apparatus that is the third exemplary embodiment of the present invention.

As shown in FIG. 10, image display apparatus of the present exemplary embodiment is made up of nine units 20_1-20_9 that are arranged in three rows and three columns. Each of units 20_1-20_9 is of the same configuration as the image display apparatus of the first exemplary embodiment, but the construction of the end portions of transparent boards 3 is different.

Transparent boards 3 of units 20_1-20_9 are configured to be joined together in the row direction and column direction.

Figure 11A:
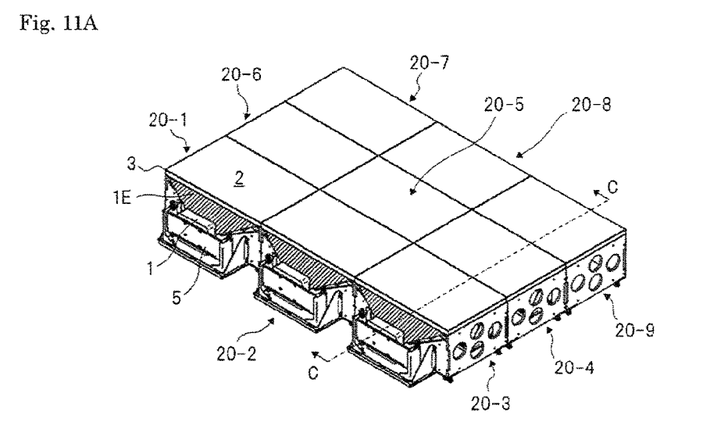
FIG. 11A is a schematic view of the state of projection of the image display apparatus shown in FIG. 10.
Figure 11B:
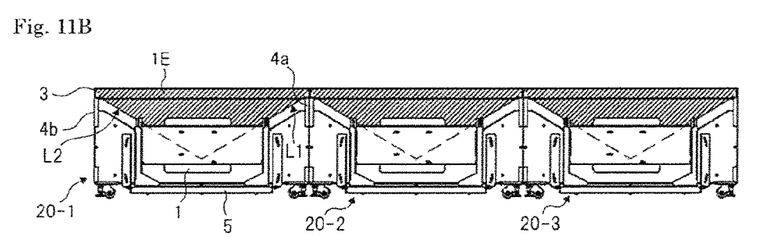
FIG. 11B is a schematic view showing the state of projection when viewed from the side in which three projectors are installed aligned in the row direction of the image display apparatus shown in FIG. 10.

FIG. 11A is a schematic view showing the state of projection of the image display apparatus shown in FIG. 10. FIG. 11B is a schematic view showing the state of projection when three units 20_1-20_3 that are aligned in the row direction of the image display apparatus shown in FIG. 10 are viewed from the side on which projectors 1 are installed. In FIGS. 11A and 11B, hatched portion 1E in which hatching is realized using diagonal lines indicates the areas through which the projected light passes from projectors 1 in each of units 20_1-20_3.

Units 20_1 and 20_2 are configured such that the end surfaces of transparent boards 3 that face each other are joined together. The angle formed by these joining surfaces and the surfaces of transparent boards 3 is approximately 90 degrees. Units 20_2 and 20_3 are also of the same construction.

Hatched portion 1E spreads at a predetermined angle in the direction of travel of projected light, similar to the example (hatched portion 1A) shown in FIGS. 5A and 5B. The angles of incidence with respect to the rear surface of transparent board 3 of two light rays L1 and L2 that pass along the outermost sides of hatched portion 1E are also substantially the same.

As shown in FIG. 11B, light rays L1 and L2 are refracted upon passage through the rear surfaces of transparent boards 3 in each of units 20_1-20_3, and light rays L1 and L2 that have passed through the rear surfaces travel within transparent boards 3. Light ray L1 arrives at the screen-2 side corner of the end portion that is supported by beam 4a, and light ray L2 arrives at the screen-2 side corner of the end portion that is supported by beam 4b.

Units 20_4-20_6 and units 20_7-20_9 are of the same construction as the above-described units 20_1-20_3 and have the above-described relation of light rays L1 and L2 and transparent boards 3.

The above-described construction enables the display of an image over the entire width of screen 2 with respect to the row direction in each of units 20_4-20_9. As a result, the projected images from projectors 1 of each unit can be displayed adjacent to each other and without gaps between, from among units 20_1-20_9, units that are aligned in the row direction.

Figure 11C:
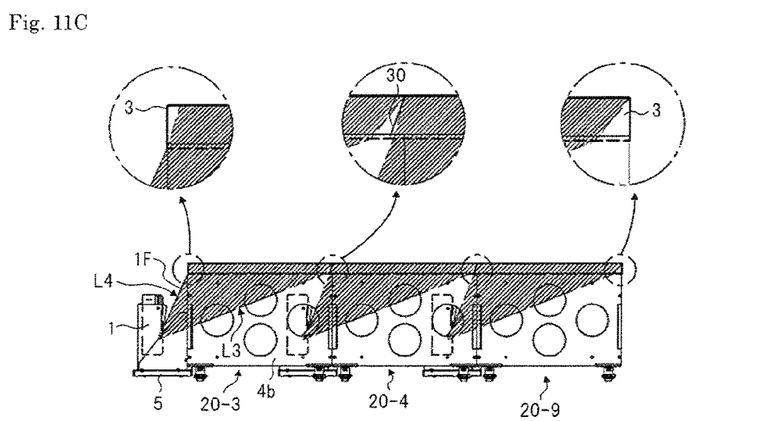
FIG. 11C is a schematic view showing the state of projection when the three units aligned in the column direction of the image display apparatus shown in FIG. 11A are cut along the alternate long and short dashed line CC.

FIG. 11C is a schematic view showing the state of projection when three units 20_3, 20_4, and 20_9 that are aligned in the column direction of the image display apparatus shown in FIG. 11A are cut along the alternate long and short dashed line CC. In FIG. 11C, hatched portion 1F that is indicated using diagonal lines indicates the areas through which projected light passes from projectors 1 of each of units 20_3, 20_4, and 20_9.

Hatched portion 1F spreads at a predetermined angle in the direction of travel of the projected light, similar to the example (hatched portion 1B) shown in FIG. 6. Of two light rays L3 and L4 that pass along the outermost sides of hatched portion 1F, the angle of incidence with respect to the rear surface of transparent board 3 of lower side light ray L3 is greater than the angle of incidence with respect to the rear surface of transparent board 3 of upper side light ray L4.

In unit 20_3, light rays L3 and L4 are each irradiated from the rear surface of transparent board 3 and are refracted upon passage through the rear surface. Light rays L3 and L4 that are irradiated from the rear surface travel inside transparent board 3. Light ray L3 then arrives at the screen-2 side corner of the end portion on the unit-20_4 side. On the other hand, light ray L4 arrives in the vicinity of the screen-2 side corner of the end portion on the projector 1 side.

In unit 20-4, light rays L3 and L4 are each irradiated from the rear surface of transparent board 3 and are refracted upon passage through the rear surface. Light rays L3 and L4 that are irradiated from the rear surface travel inside transparent board 3. Light ray L3 then arrives at the screen-2 side corner of the end portion on the side of unit 20_9. On the other hand, light ray L4 arrives at the screen-2 side corner of the end portion on the unit-20_3 side.

In unit 20_9 as well, light rays L3 and L4 are each irradiated from the rear surface of transparent board 3 and are refracted upon passage through the rear surface. Light rays L3 and L4 that have been irradiated from the rear surface travel inside transparent board 3. Light ray L3 then arrives at the screen-2 side corner of the end portion on the side opposite unit 20_4. On the other hand, light ray L4 arrives at the screen-2 side corner of the end portion on the unit-20_4 side.

End portion 30 on the unit-20_4 side of transparent board 3 of unit 20_3 is cut diagonally. If the angle formed by the cut surface (end surface) of end portion 30 and the surface of transparent board 3 is θ1, the angle formed by light ray L3 in transparent board 3 in unit 20_3 and the surface of transparent board 3 is θ2, and the angle formed by light ray L4 in transparent board 3 in unit 20_4 and the surface of transparent board 3 is θ3, then the relation θ2≤θ1≤θ3 is satisfied.

In addition, the end portion on the unit-20_3 side of transparent board 3 of unit 20_4, i.e., the end portion that contacts end portion 30 of transparent board 3 of unit 20_3, is cut diagonally. If the angle formed by the cut surface (end surface) of this end portion and the surface of transparent board 3 is θ4, then θ4=180°−θ1.

Since the end surfaces of transparent boards 3 of each of units 20_3 and 20_4, which contact each other, are configured as described hereinabove, these end surfaces can be joined without having any gap. In addition, light ray L3 on the unit-20_3 side and light ray L4 on the unit-20_4 side are emitted from the border portions of the surfaces of these transparent boards 3, whereby the projected image of projector 1 of unit 20_3 and the projected image of projector 1 of unit 20_4 can be displayed adjacent to each other without having any gap.

The relations θ2≤θ1≤θ3 and θ4=180°−θ1 are also satisfied in units 20_4 and 20_9 that are aligned in the column direction, similar to the case of units 20_3 and 20_4 described above. As a result, the end surfaces of transparent boards 3 of each of units 20_4 and 20_9, which contact each other, can be joined without having any gap, and the projected image of projector 1 of unit 20_4 and the projected image of projector 1 of unit 20_9 can be displayed adjacent to each other without having any gap.

Satisfying the relations θ2≤θ1≤θ3 and θ4=180°−θ1 in the other units that are aligned in the column direction obtains the same effects as described hereinabove.

In the present exemplary embodiment as well, notches 3a and 3b shown in FIG. 5B are provided on both end portions of transparent boards 3 that are supported by beams 4a and 4b in each of units 20_1-20_9. Transparent board 3 is supported by support unit 4 with these notches 3a and 3b fitted in the angled edge portions on the upper edges of beams 4a and 4b. Transparent board 3 is able to slide along beams 4a and 4b.

By means of the above-described slide construction, transparent boards 3 can be easily joined between, for example, units aligned in the column direction.

In addition, a plurality of openings 6 are provided in beams 4a and 4b of support unit 4 of each of units 20_1-20_9, whereby the rise of temperature in support unit 4 that accommodates projector 1 can be prevented, as in the second exemplary embodiment.

In the image display apparatus of the second or third exemplary embodiment, the number and form of arrangement of the units is not limited. Two or more units may be aligned in a single row or in matrix form.

Further, in the image display apparatus of the second or third exemplary embodiment, of the plurality of units, two adjacent units in the direction of projection of projector 1 are configured such that the end surfaces of transparent boards 3 join together, and an antireflective film may also be formed on the end surfaces.

In the case described above, the antireflective film may be provided on, of the above-described joined end surfaces of the two adjacent units, the end surface of the side on which projector 1 is arranged. For example, in the two adjacent units 10_2 and 10_3 shown in FIG. 9C, the antireflective film may be formed on the end surface of end portion 30 on the unit-10_2 side.

The following effects can be obtained by means of the construction having the above-described antireflective film.

For example, at portions in which the end surfaces of transparent boards 3 of units 10_2 and 10_3 are joined together, a microscopic air layer is interposed between these end surfaces. As a result, when stray light enters the end surface of end portion 30 of transparent board 3 in unit 10_2, scattering of light occurs at this end surface, and this scattered light causes whitening of the border portion of the display images of units 10_2 and 10_3. Although slight, there is some stray light in the projected light from projector 1, and stray light is also produced in the process in which projected light passes through transparent board 3.

By forming an antireflective film on the end surface of end portion 30, stray light is absorbed by the antireflective film and the above-described whitening of the border portions of the displayed images can be prevented.

A black or grey material is preferably used as the antireflective film.

The processing of the end surfaces of transparent board 3 to a mirror surface state such that an air layer is not interposed entails an increase in fabrication costs and is therefore not practical.

In addition, based on the relation of the angle of incidence of projected light, the amount of irradiated stray light at the end portion of transparent board 3 of unit 10_3 that is joined to end portion 30 described above is less than for end portion 30 described above. As a result, when necessary, an antireflective film is preferably formed on the end portion of transparent board 3 on the unit-10_3 side.

In addition, support units 4 of two or more units may be formed as a single unit in the image display apparatus of the second or third exemplary embodiment.

Still further, a control device (not shown) that controls the operation of projector 1 of each unit may be provided, and this control device may cause images based on a video signal from an outside video supply device (such as video equipment or a personal computer) to be projected by projector 1 of each unit. In this case, the control device may divide the images based on the input video signal into a plurality of divided images according to the number of units and then display each divided image on a corresponding unit.

Still further, for each unit, a sensor that detects the presence, absence, or movement of people on screen 2 may be installed in support unit 4. For example, an infrared sensor may be used as the sensor. In this case, the above-described control device may change the content of the images that are projected by projector 1 of each unit according to the output signal of the sensor of each unit.

Still further, in any of the image display apparatuses of the first to third exemplary embodiments, a plurality of transparent boards 3 may be provided for one projector 1. For example, in the image display apparatus shown in FIG. 1, transparent board 3 may be divided into a plurality of areas in the direction parallel to beams 4a and 4b. In this case, the end surfaces that contact each other in adjacent transparent boards are cut diagonally. In this case, the angle of the end surface is determined based on Snell's law and based on the angle of incidence at which projected light from projector 1 is irradiated into transparent board 3 and the absolute refractive index of transparent board 3 and the absolute refractive index of the matter (air) inside support unit 4. The absolute refractive index is the relative refractive index inherent to matter with respect to a vacuum.

A plurality of projectors 1 may be provided for a single transparent board 3.

In addition, a wide field of view transmissive rear-screen for ultra-short throw projectors such as the screen film "SaiVis" for use in projectors from "Mitsubishi Paper Mills Limited can be used for screen 2.

In addition, screen 2 may be provided straddling a plurality of units.

Alternatively, a screen may be provided by forming microscopic unevenness on the surface of transparent board 3.

In addition, the end portion of transparent board 3 on the projector 1 side may be cut diagonally. For example, the end portion on the projector 1 side of transparent board 3 shown in FIG. 6 and the end portion on the projector 1 side of transparent board 3 of, of units 10_2 and 10_3, unit 10_2 may be cut diagonally along light ray L4, whereby an image can be projected over the entire surface of screen 2.

Further, at least one fan may be provided in openings 6 of beams 4a and 4b of support unit 4. In this case, the fan can forcibly take in or exhaust air.

Finally, although the present invention can assume forms such as described in the following Notes 1-11, the present invention is not limited to these forms.

(Supplementary Note 1)

An image display apparatus has:

a transparent board that transmits visible light;

a screen that is provided on one surface of the transparent board;

a projector that projects an image toward the screen from the side of the other surface of the transparent board; and a support unit that supports the transparent board from the side of the other surface;

wherein the projector is arranged outside a space that is enclosed by the transparent board and the support unit.

(Supplementary Note 2)

In the image display apparatus as described in SUPPLEMENTARY Note 1, a plurality of units that each include at least the projector and the transparent board are arranged in a row or in matrix form.

(Supplementary Note 3)

In the image display apparatus as described in SUPPLEMENTARY Note 2, form amoug the plurality of units, two units that are adjacent in the direction of projection of the projector are configured such that the end surfaces of the transparent boards that are adjacent and that are orthogonal to the direction of projection of the projector join together; the joining edge surfaces being formed such that a joining portion on the other surface is positioned more on the projector side than a joining portion on the one surface.

(Supplementary Note 4)

In the image display apparatus as described in SUPPLEMENTARY Note 3, antireflective film is formed on at least one of the joining end surfaces of the two units.

(Supplementary Note 5)

In the image display apparatus described in SUPPLEMENTARY Note 4, the antireflective film is formed on, from among the end surfaces, that are joined, of the two units, the end surface that is positioned on the projector side.

(Supplementary Note 6)

In the image display apparatus as described in any one of SUPPLEMENTARY Notes 2 to 5, the screen is provided straddling the plurality of units.

(Supplementary Note 7)

In the image display apparatus as described in any one of SUPPLEMENTARY Notes 1 to 6, the support unit includes first and second beams that are opposite each other and that are provided along the direction of projection of the projector; the first and second beams supporting first and second ends, respectively, of the transparent board that are opposite each other.

(Supplementary Note 8)

In the image display apparatus described in SUPPLEMENTARY Note 7, notches are formed in the first and second end portions of the transparent board, the notches being supported by the first and second beams.

(Supplementary Note 9)

In the image display apparatus as described in SUPPLEMENTARY Note 7 or 8, each of the first and second beams includes at least one opening.

(Supplementary Note 10)

The image display apparatus described in any one of SUPPLEMENTARY Notes 1 to 9 has a protective part on the screen.

(Supplementary Note 11)

An image display method includes: forming a screen on one surface of a transparent board that transmits visible light; supporting the transparent board from the side of the other surface by means of a support unit; and projecting an image toward the screen from the side of the other surface of the transparent board by means of a projector that is arranged outside a space that is enclosed by the transparent board and the support unit to display an image on the screen.

What is claimed is:

1. An image display apparatus comprising:

a transparent hoard that transmits visible light;

a screen that is provided on a first surface of said transparent board;

a projector that projects images toward said screen from the side of a second surface of said transparent board; and a support unit that supports said transparent board from the side of said second surface;

wherein said projector is arranged outside a space that is enclosed by said transparent board and said support unit;

wherein a plurality of units that each include at least said projector and transparent board are arranged in a row or in matrix form; and wherein: from among said plurality of units, two units that are adjacent in a direction of projection of said projector are configured such that an end surface of said transparent board of one unit that is orthogonal to the direction of projection of said projector is joined to an end surface of said transparent board of the other unit that is orthogonal to the direction of projection of said projector to form a joined edge surface; said joined edge surface being formed such that a joining portion on said second surface is positioned more on said projector side than a joining portion on said first surface.

2. The image display apparatus as set forth in claim 1, wherein antireflective film is formed on at least one surface of said joined end surface of said two units.

3. The image display apparatus as set forth in claim 2, wherein said antireflective film is formed on the end surface that is positioned on said projector side of said joined edge surface of said two units.

4. The image display apparatus as set forth in claim 1, wherein said screen is provided straddling said plurality of units.

5. The image display apparatus as set forth in claim 1, wherein said support unit includes first and second beams that are opposite each other and that are provided along the direction of projection of said projector; said first and second beams supporting first and second end portions of said transparent board that are opposite each other.

6. The image display apparatus as set forth in claim 5, wherein notches are formed in said first and second end portions of said transparent board, the notches being supported by said first and second beams.

7. The image display apparatus as set forth in claim 5, wherein each of said first and second beams includes at least one opening.

8. The image display apparatus as set forth in claim 1, further comprising a protective part on said screen.

9. An image display method comprising:
   forming a screen on a first surface of a transparent board that transmits visible light;
   supporting said transparent board from the side of a second surface by a support unit; and
   projecting an image toward said screen from the side of said second surface of said transparent board by a projector that is arranged outside a space that is enclosed by said transparent board and said support unit to display an image on said screen,
   arranging a plurality of units that each include at least said projector and transparent board in a row or in matrix form;
   configuring from among said plurality of units, two units that are adjacent in a direction of projection of said projector such that an end surface of said transparent board of one unit that is orthogonal to the direction of projection of said projector is joined to an end surface of said transparent board of the other unit that is, orthogonal to the direction of projection of said projector to form a joined edge surface; and
   forming said joined edge surface such that a joining portion on said second surface is positioned more on said projector side than a joining portion on said first surface.

10. An image display apparatus comprising:
   a transparent board that transmits visible light;
   a screen that is provided on a first surface of said transparent board;
   a projector that projects images toward said screen from the side of a second surface of said transparent board; and
   a support unit that supports said transparent board from the side of said second surface;
   wherein said projector is arranged outside a space that is enclosed by said transparent board and said support unit,
   wherein said support unit includes first and second beams that are opposite each other and that are provided along the direction of projection of said projector; said first and second beams supporting first and second end portions of said transparent board that are opposite each other,
   wherein notches are formed in said first and second end portions of said transparent board, the notches being supported by said first and second beams.

\* \* \* \* \*